Jan. 10, 1967   KOZO YAMAMOTO   3,296,925
PICTURE PROJECTING AND SOUND RECORD REPRODUCING MAGAZINES
Filed Oct. 22, 1963   18 Sheets-Sheet 1

INVENTOR
KOZO YAMAMOTO
By Stevens, Davis, Miller & Mosher
ATTORNEYS

Jan. 10, 1967  KOZO YAMAMOTO  3,296,925
PICTURE PROJECTING AND SOUND RECORD REPRODUCING MAGAZINES
Filed Oct. 22, 1963  18 Sheets-Sheet 2

INVENTOR
KOZO YAMAMOTO
By Stevens, Davis, Miller & Mosher
ATTORNEYS

INVENTOR
KOZO YAMAMOTO
By Stevens, Davis, Miller & Mosher
ATTORNEYS

FIG. 12
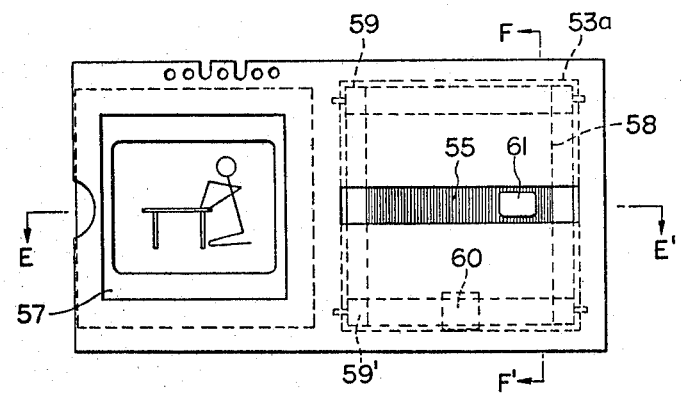
FIG. 13
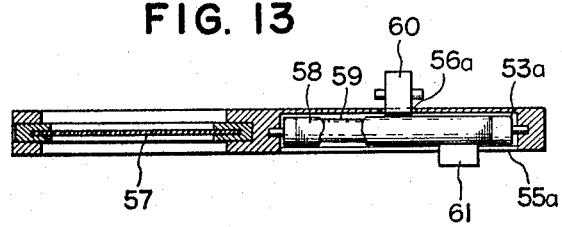
FIG. 16   FIG. 15   FIG. 14
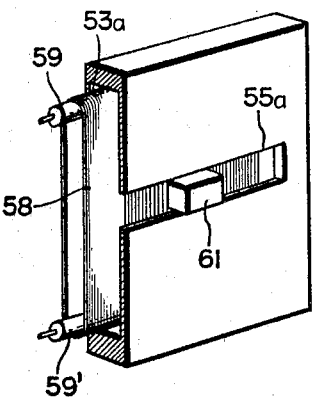 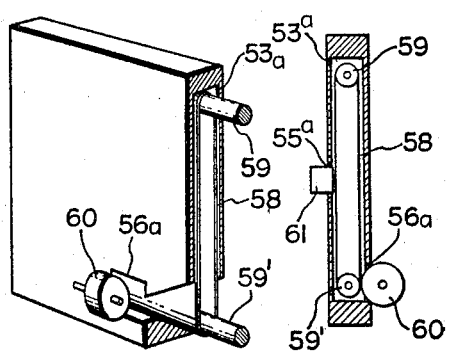 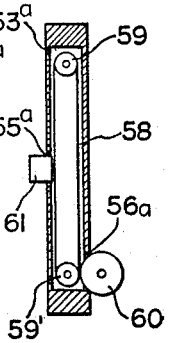

FIG. 17
FIG. 18
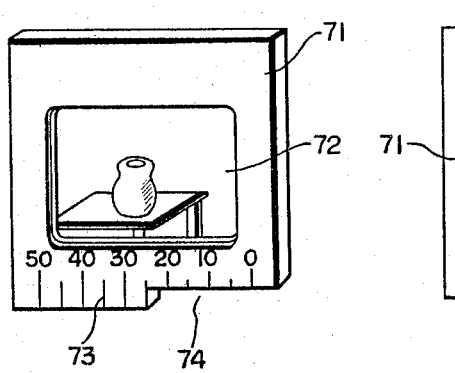
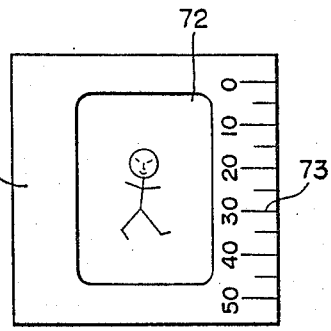
FIG. 19
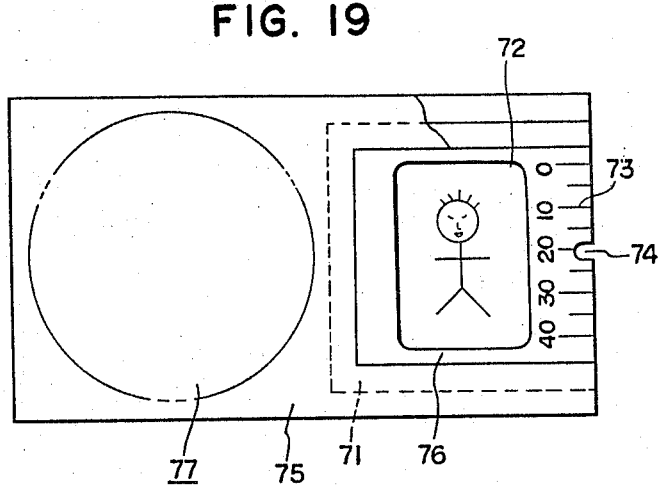
FIG. 20
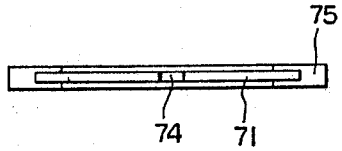
INVENTOR
KOZO YAMAMOTO Jan. 10, 1967  KOZO YAMAMOTO  3,296,925
PICTURE PROJECTING AND SOUND RECORD REPRODUCING MAGAZINES
Filed Oct. 22, 1963  18 Sheets-Sheet 6

INVENTOR
KOZO YAMAMOTO
By Stevens, Davis, Miller + Mosher
ATTORNEYS

Jan. 10, 1967 KOZO YAMAMOTO 3,296,925
PICTURE PROJECTING AND SOUND RECORD REPRODUCING MAGAZINES
Filed Oct. 22, 1963 18 Sheets-Sheet 7

INVENTOR
KOZO YAMAMOTO
By Stevens, Davis, Miller & Mosher
ATTORNEYS

Jan. 10, 1967  KOZO YAMAMOTO  3,296,925
PICTURE PROJECTING AND SOUND RECORD REPRODUCING MAGAZINES
Filed Oct. 22, 1963  18 Sheets-Sheet 8

INVENTOR
KOZO YAMAMOTO
By Stevens, Davis, Miller & Mosher
ATTORNEYS

Jan. 10, 1967 KOZO YAMAMOTO 3,296,925
PICTURE PROJECTING AND SOUND RECORD REPRODUCING MAGAZINES
Filed Oct. 22, 1963 18 Sheets-Sheet 9

INVENTOR
KOZO YAMAMOTO
By Stevens, Davis, Miller + Mosher
ATTORNEYS

INVENTOR
KOZO YAMAMOTO
By Stevens, Davis, Miller & Mosher
ATTORNEYS

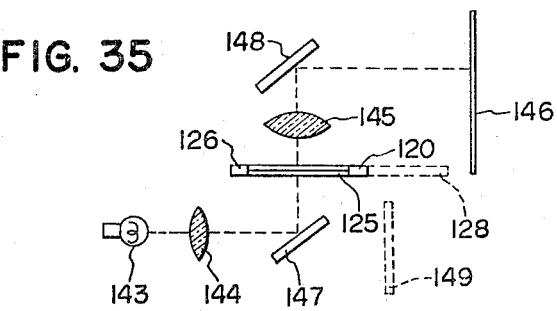
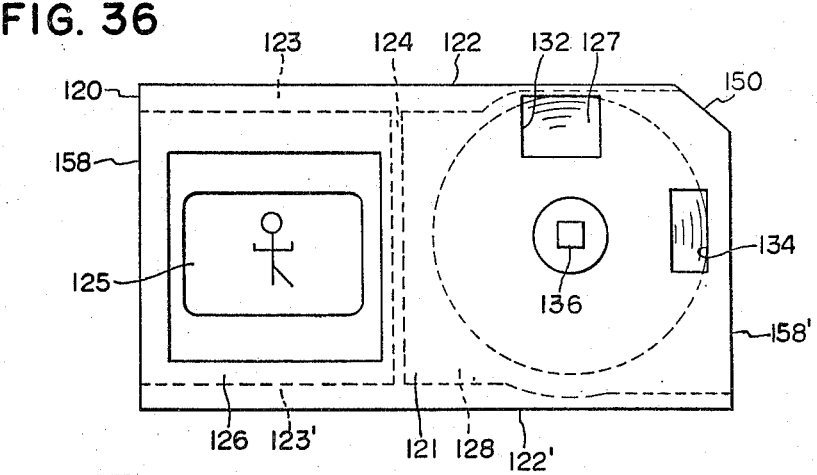
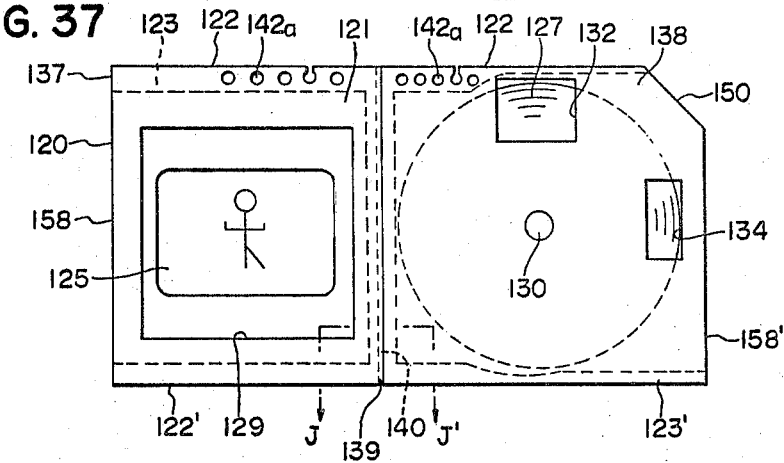

Jan. 10, 1967  KOZO YAMAMOTO  3,296,925
PICTURE PROJECTING AND SOUND RECORD REPRODUCING MAGAZINES
Filed Oct. 22, 1963  18 Sheets-Sheet 12

INVENTOR
KOZO YAMAMOTO
By Stevens, Davis, Miller & Mosher
ATTORNEYS

Jan. 10, 1967 KOZO YAMAMOTO 3,296,925
PICTURE PROJECTING AND SOUND RECORD REPRODUCING MAGAZINES
Filed Oct. 22, 1963 18 Sheets-Sheet 13

INVENTOR
KOZO YAMAMOTO
By Stevens, Davis, Miller & Mosher
ATTORNEYS

Jan. 10, 1967 KOZO YAMAMOTO 3,296,925
PICTURE PROJECTING AND SOUND RECORD REPRODUCING MAGAZINES
Filed Oct. 22, 1963 18 Sheets-Sheet 14

INVENTOR
KOZO YAMAMOTO
By Stevens, Davis, Miller & Mosher
ATTORNEYS

Jan. 10, 1967　　　KOZO YAMAMOTO　　　3,296,925
PICTURE PROJECTING AND SOUND RECORD REPRODUCING MAGAZINES
Filed Oct. 22, 1963　　　　　　　　　　　　18 Sheets-Sheet 15

INVENTOR
KOZO YAMAMOTO
By Stevens, Davis, Miller & Mosher
ATTORNEYS

INVENTOR
KOZO YAMAMOTO
ATTORNEYS

INVENTOR
KOZO YAMAMOTO
By Stevens, Davis, Miller + Mosher
ATTORNEYS

Jan. 10, 1967     KOZO YAMAMOTO     3,296,925
PICTURE PROJECTING AND SOUND RECORD REPRODUCING MAGAZINES
Filed Oct. 22, 1963     18 Sheets-Sheet 18

INVENTOR
KOZO YAMAMOTO
By Stevens, Davis, Miller & Mosher
ATTORNEYS

United States Patent Office 3,296,925
Patented Jan. 10, 1967

3,296,925
PICTURE PROJECTING AND SOUND RECORD
REPRODUCING MAGAZINES
Kozo Yamamoto, Hirakata-shi, Japan, assignor to Matsushita Electric Industrial Co., Ltd., Osaka, Japan, a corporation of Japan
Filed Oct. 22, 1963, Ser. No. 317,895
Claims priority, application Japan, Oct. 25, 1962, 37/47,711; Oct. 26, 1962, 37/63,854; Oct. 29, 1962, 37/64,322, 37/64,323, 37/66,324, 37/64,325, 37/64,326, 37/64,327, 37/64,328, 37/64,329; Dec. 15, 1962, 37/57,223; Dec. 17, 1962, 37/77,194, 37/77,195, 37/77,196, 37/77,197, 37/77,198; Dec. 18, 1962, 37/77,462, 37/77,463; Dec. 19, 1962, 37/77,710; Dec. 24, 1962, 37/79,054; Dec. 25, 1962, 37/79,443, 37/79,444; Dec. 28, 1962, 37/80,676; Mar. 8, 1963, 38/17,507, 38/17,509, 38/17,510; Mar. 27, 1963, 38/22,186; July 8, 1963, 38/52,806
4 Claims. (Cl. 88—28)

The present invention generally relates to a picture projecting and sound record reproducing magazine adapted for sound record reproduction corresponding to a projected picture, and more particularly to a magazine in which a slide or picture element and a sound recording member such as a recording disc or recording tape are disposed flatwise and separately from each other in respective compartments of a single casing of thin thickness.

In the art of slide projection in which each element of a filmstrip photographed by a camera is mounted in a frame holder and projected by means of a slide projector, there has been developed a method of reproducing sound from a sound source such as a sound recording tape, sound recording disc or the like which corresponds with each picture to be projected, that is, a specific slide film.

According to such conventional method, each of said slide films is generally individually mounted in a single frame holder, while, in most cases, the sound source therefor is continuously recorded on a magnetic sound recording tape, grooved sound recording disc, magnetic sound recording disc, or the like. Therefore, it is quite probable that, during the projection of a succession of slide films, erroneous arrangement of the slide films on account of some hitch will result in explanation or music which differs from the picture being projected, and extreme care should be taken of the handling of such slide films. Moreover, when a succession of the slide films is projected at intervals of a certain time, sound must be recorded on the magnetic tape or the like in a manner that full synchronism with a changeover speed of the slide films can be obtained, but this will generally be encountered by a problem in view of the recording technique applicable to such sound source. Further, when it is desired to select and project a specific slide film out of a multiplicity of slide films, it may be a matter of difficulty to find a desired sound-recorded portion corresponding with said selected slide film out of an elongated magnetic tape or recording disc constituting the sound source. Apparently, such method of application has so far been impracticable.

With the above defects of prior technique in view, the primary object of the invention is to provide an improved picture projecting and sound record reproducing magazine which is adapted for sound record reproduction corresponding to a projected picture.

Another object of the invention is to provide a magazine and comprising means for mounting a slide element to be projected and a sound source, i.e., a sound recording disc, tape or belt, to be reproduced in juxtaposition with each other in the magazine.

There are other objects and particularities of the invention which will become obvious from the following description with reference to the accompanying drawings, in which:

FIG. 1 is a plan view of a magazine according to the invention having a sound recording disc adapted to effect sound reproduction corresponding to a projected picture;
FIG. 2 is a sectional view taken on the line A'—A' of FIG. 1;
FIG. 3 is an enlarged perspective view of a portion of the sound recording disc in the magazine of FIG. 1;
FIG. 4 is a plan view of a magazine of the invention wherein an annular sound recording disc is incorporated;
FIG. 5 is a sectional view taken on the line B'—B' of FIG. 4;
FIG. 6 is a plan view of a magazine of the invention wherein a sound recording tape is incorporated;
FIG. 7 is a sectional view taken on the line C'—C' of FIG. 6;
FIG. 8 is a plan view of another form of the magazine having a sound recording tape;
FIG. 9 is a plan view of a still another form of the magazine of the invention wherein a sound recording tape is incorporated;
FIG. 10 is a plan view of a magazine of the invention with a sound recording tape, said magazine being divided into halves and detachably coupled together;
FIG. 11 is a sectional view taken on the line D'—D' of FIG. 10;
FIG. 12 is a plan view of a magazine of the invention having a sound recording belt;
FIG. 13 is a sectional view taken on the line E'—E' of FIG. 12;
FIG. 14 is a sectional view taken on the line F'—F' of FIG. 12;
FIG. 15 is a perspective view of a sound record reproducing section of the magazine of FIG. 12, as viewed from the front side thereof;
FIG. 16 is a back perspective view of the sound record reproducing section of FIG. 15;
FIG. 17 is a perspective view of a slide element of the invention having a cutout portion;
FIG. 18 is a plan view of the slide element of FIG. 17 before being provided with the cutout;
FIG. 19 is a plan view of a magazine of the invention, showing a slide element with a cutout mounted in said magazine;
FIG. 20 is a side elevational view of the magazine of FIG. 19;
FIG. 21 is a plan view of another form of the magazine having a slide element formed with a cutout;
FIG. 22 is a plan view of still another form of the magazine having a slide element formed with a cutout;
FIG. 23 is a diagrammatic arrangement of a mechanism for taking out a playing control signal from a magazine having the slide element shown in FIG. 17;
FIG. 24 is a perspective view showing how a multiplicity of the magazines as shown in FIG. 22 can be juxtaposed in aligned relation with one another;
FIG. 25 is a plan view of a magazine of the invention having two picture sources disposed in juxtaposition with each other;
FIG. 26 is a front elevational view of the magazine of FIG. 25;

FIG. 35 is a schematic layout of a mechanism of a player adapted for a magazine shown in FIG. 31;

FIG. 36 is a plan view of another embodiment of the magazine of the invention having a sound recording disc therein;

FIG. 37 is a plan view of a modification of the magazine of FIG. 36, said magazine being divided into halves and detachably coupled together;

Figure 1:
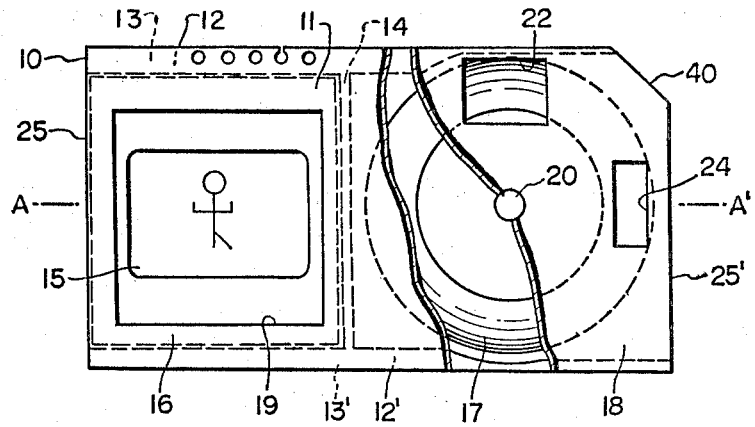

The present invention illustrated in FIG. 1 and succeeding drawings provides a magazine which comprises a slide element and a sound recording member accommodated in a casing of thin thickness.

Description will now be made with regard to the content of the invention which eliminates the functional as well as structural defects of prior methods, and provides a magazine wherein a slide element and a sound recording member are housed in a single casing of thin thickness whereby compilation of such slide films can easily and freely be attained.

Figure 2:
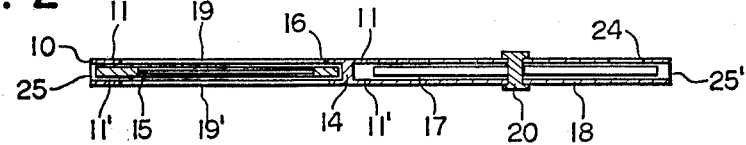

An embodiment of a magazine according to the invention is illustrated in FIGS. 1 and 2. As shown in the drawings, a magazine 10 according to the invention comprises thin sheets 11 and 11' of transparent or opaque plastic material, paper, metal, or the like, which are disposed opposite to each other and spaced apart with a minute gap therebetween. Opposite sides 12 and 12' of the sheets 11 and 11' are bonded together or tightly closed by longitudinal members 13 and 13'. A transverse member 14 is disposed centrally to the magazine 10 and between the opposed sheets 11 and 11' to divide the magazine 10 into two sections, that is, a section 16 for accommodating a slide element 15 constituting a picture source and a section 18 for accommodating a grooved or magnetic sound recording disc 17 forming a sound source. Both ends of the magazine 10 are left open to provide sockets 25 and 25' for the slide element 15 and the sound recording disc 17, respectively.

On the upper and lower faces of the compartment 16 for the slide element 15 in the magazine 10, there are formed two opposed transparent portions or windows 19 and 19' for transmitting light therethrough. While, a shaft 20 is provided at the compartment 18 for the sound recording disc 17 for rotatably supporting the disc 17.

Openings 22 are formed on upper and lower faces of the compartment 18 in opposition to each other for receiving therein rollers, which abut and urge the recording disc 17 to rotate. An opening 24 is further formed on one face of the compartment 18 for receiving therein a reproducing head such as a magnetic head or pickup in an abutting relation with the recording disc 17.

Figure 3:
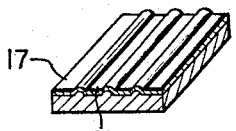

The slide element 15 may be constituted directly of a one-scene film instead of an ordinary one wherein a film is mounted in a frame such as of paper. The sound recording disc 17 may be any of a grooved sound recording disc, a magnetic sound recording disc having spirally disposed guide grooves 21 as shown in FIG. 3, an annular recording disc as shown in FIG. 4, a sound sheet recently developed and the like.

Figure 4:
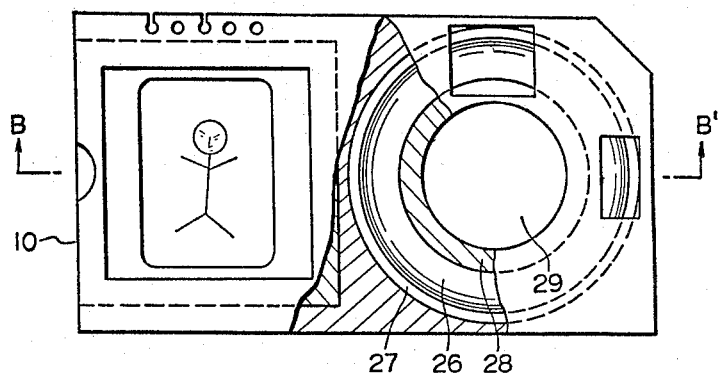
Figure 5:
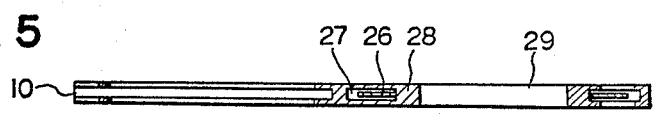

In the case of said annular sound recording disc, a cylindrical member 28 having a hollow portion 29 therein is provided in a compartment 27 of the magazine 10 for accommodating the annular sound recording disc 26, as shown in FIG. 4, said cylindrical member 28 serving as a rotary shaft for the annular recording member 26.

In the projection operation, a suitable number of such magazines 10 may be stacked up in tiers or arranged in juxtaposition and successively mounted in a projector at a certain interval of time, for example, at intervals of 5, 10 and 20 seconds depending on the time required for explanation, for thereby making continuous projection and sound reproduction.

Said recording disc 17 may have an outside diameter of 70 mm., a spiral pitch of sound grooves of 0.4 mm., and a number of revolutions of the order of 16 to 33 r.p.m. Then, a sound recording time of the order of 30 to 60 seconds can be obtained with such recording disc, and this will be quite enough for the explanation of each scene taken on an ordinary slide element.

As will be understood from the foregoing description, the magazine of the invention is formed of a casing of thin thickness which is of a unitary structure or built up into a unitary structure wherein the sound source and the picture source are disposed separately from each other. Therefore, it will be apparent that desired compilation is freely practicable, and arrangement of magazines may be changed or a portion thereof may be picked out or some magazines may be added thereto depending on the degree of knowledge of an audience of the slides or on the content of educational training. Thus, the magazines can be most effectively utilized and there is no need of preparing extra sources of pictures and sound. The magazine of the invention contains each element of the sound source and the picture source therein, which facilitates the preparation of both of the picture and sound sources, and eliminates any possibility of bringing forth any discrepancy between the picture and sound sources during storage.

Since the sound recording disc and the slide element are disposed flatwise in the single magazine, the magazine can be made to have a thin thickness. This feature provides an extremely simple mechanism of mounting the magazine in and detaching it from a player, and provides ease of handling, preservation and compilation. Another advantage of the magazine is that, since the sound recording disc and the slide element are protected by the casing, no special care is required for handling and the magazines can be safely stacked up in tiers. Further, correct positioning of the magazine can be obtained at all times irrespective of the longitudinal or lateral position of the slide element. This is attained by a cutout 40 formed at one corner of the magazine 10, as shown in FIG. 1. Therefore, accurate insertion of the slide element 15 while assembling the magazine 10 will obviate any possibility of erroneous mounting of the magazine in a projector.

Still another advantage resides in the use of the sound recording disc as a sound source, which provides a great practical effect especially for an educational purpose, because little time is necessary to move a head or pickup during repeated listening of a short period.

It will further be known that, owing to the structure of the magazine 10 wherein two thin sheets are disposed opposite to each other, the magazine can easily be fabricated and assembled at a low cost and may even be made of paper. Automatic control of a group of such magazines 10 can also be made in an easy manner. For the magazines of the invention, a conventional method of control based on the control of a sound source may be applied. Or more precisely, a signal track may be provided at a position adjacent the center of recorded portion of the sound recording disc or at the back face thereof, and a signal reproducing head for reproducing the signal track may be separately provided so as to perform the reproduction of the specific signal. A method of control based on the control of the picture source may likewise be applied since the sound and picture sources contained in each unit magazine can be utilized in series.

Now, another embodiment of the invention will be described with reference to FIGS. 6–11. A magazine 30 of this embodiment comprises two thin transparent or opaque sheets 31 and 31' of plastic material, paper, metal, or the like disposed opposite to each other and spaced apart with a minute gap, for example, an internal face-to-face distance of 2 mm. The two opposite sides of the sheets 31 and 31' are bonded together or tightly closed by longitudinal members 32 and 32', respectively. A partition member 33 is disposed centrally to the magazine 30 to define two sections on both sides thereof, that is, a section 35 for accommodating a slide element 34 forming a picture source and a section 37 for accommodating an endless magnetic sound recording tape 36 of about 2 mm. in width forming a sound source.

Figure 6:
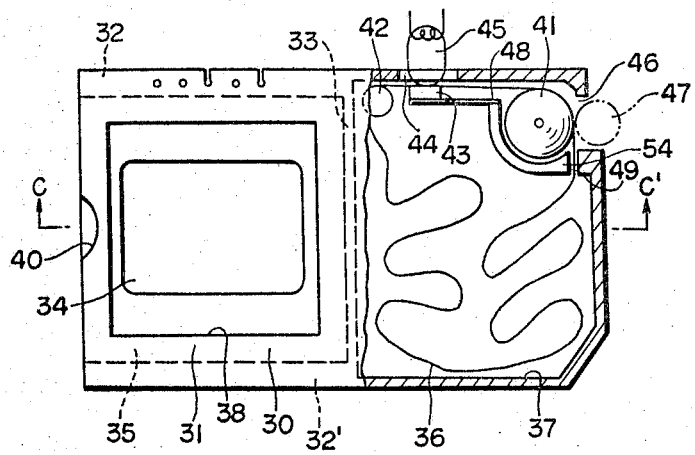
Figure 7:
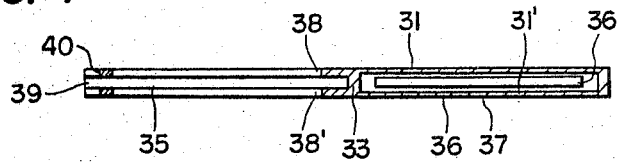

On the upper and lower faces of the compartment 35 for the slide element 34 in the magazine 30, there are formed transparent portions or windows 38 and 38' for transmitting light therethrough. At one edge of the magazine 30, a pocket 39 is provided and a recess 40 is formed to facilitate the access to the slide element 34. In the compartment 37 for the endless magnetic sound recording tape 36, there are provided guide rollers 41 and 42 for the magnetic tape 36 and a pad 43. An opening 44 is formed in the magazine body at a portion opposite the pad 43 so that a reproducing head 45 can abut the endless magnetic sound recording tape 36 through the opening 44. Further, an opening 46 is provided at the side opposite the guide roller 41 so that a driving wheel 47 rotating at a constant speed can drive the endless magnetic sound recording tape 36 through said opening 46, with a portion of said tape 36 interposed between the driving wheel 47 and the guide roller 41. Said pad 43 is arranged to support the endless magnetic sound recording tape 36 by means of a suitable resilient strip 48. On the side of the guide roller 41, there is formed a tape guide groove 49 which runs in the tangential direction of said guide roller 41. The endless magnetic sound recording tape 36 is suitably rigid and is successively accommodated in the compartment 37 in a folded state as shown in FIG. 6.

Figure 8:
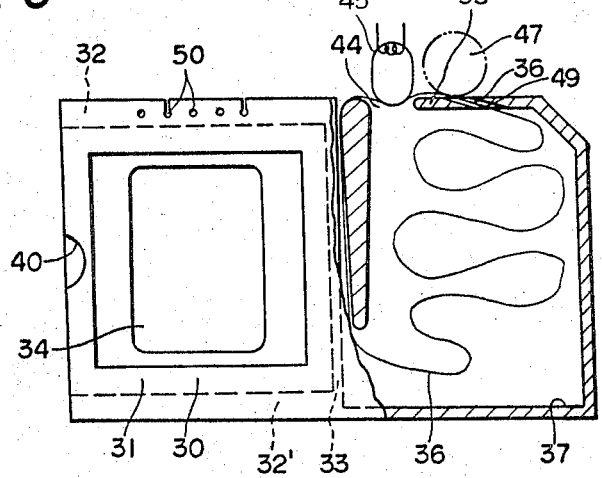

In the embodiment just described, the reproducing head 45 and the driving wheel 47 are disposed on the two sides of the compartment 37 for the endless magnetic tape 36. But, the magazine 30 may be constituted in a manner as shown in FIG. 8. Or more precisely, the reproducing head 45 and the driving wheel 47 may be disposed on one side of the compartment 37 in juxtaposed relation, and the endless magnetic sound recording tape 36 may be guided through a tape guide groove 49 in a manner that said tape 36 is exposed outside from the side of the compartment 37. The endless tape 36 traveling under suitable tension is abutted by the reproducing head 45 through the opening 44, and the driving wheel 47 drives the endless magnetic sound recording tape 36 while forcing it onto a side face 53 of the compartment 37, said endless tape 36 being guided from said side face 53 inwardly of said compartment 37 through the guide groove 49.

Figure 9:
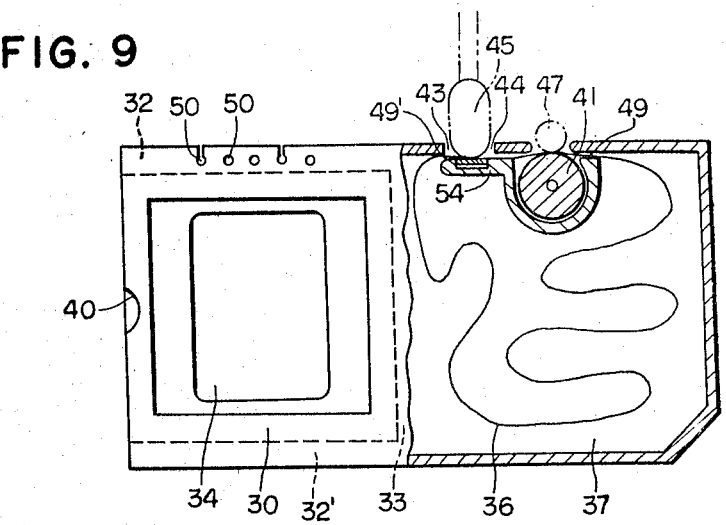

Guide grooves 49 and 49' may be formed in a cover 54 of the tape guide roller 41, as shown in FIG. 9. The pad 43 may be provided at a portion of said cover 54 in opposition to the reproducing head 45.

Figure 10:
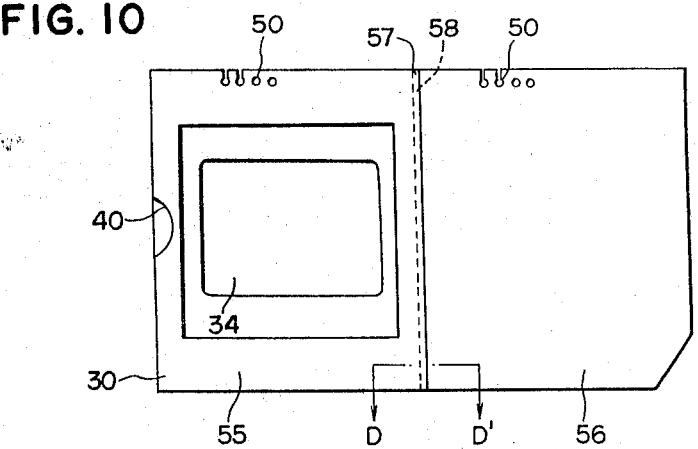
Figure 11:
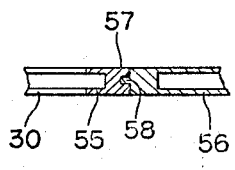

The magazine 30 may be formed of a compartment structure 55 for the slide element 34 and a compartment structure 56 for the endless magnetic sound recording tape 36 detachably coupled together at their end edges, as shown in FIGS. 10 and 11. For example, a groove 57 may be formed in the end edge of the structure 55 and a feather formed in the opposing end edge of the structure 56 to form a feather and groove joint whereby the structures 55 and 56 can be coupled together. In this case, code holes 50 may preferably be provided in each of the structures 55 and 56.

In playing the magazine 30 according to this embodiment, light is made to strike the slide element 34 in the magazine 30 to project the picture carried thereon, and at the same time, the endless magnetic sound recording tape 36 accommodated in the same magazine 30 is driven by the driving wheel 47. Thus, explanation, music or the like corresponding to the picture carried on the slide element 34 is reproduced, and sound reproduction is made through a suitable amplifying and sound reproducing system.

With said endless magnetic sound recording tape 36, sound recording for a period of the order of 60 seconds can be attained because the tape of a length of about 2 mm. can be accumulated in the compartment 37 in a folded manner, as shown in the drawings. In the case of the magazine of FIG. 9, the driving wheel 47 may be driven in the reverse direction with the reproducing head 45 disengaged from the tape 36. In this manner, the endless magnetic sound recording tape 36 can be fed in the reverse direction and any portion of sound records which one fails to catch can be reproduced again.

FIGS. 12–16 illustrate a further embodiment according to the invention. An endless sound recording belt 58 such as an endless magnetic sound recording belt or cutting recording belt carrying thereon a sound record related with a picture source 57a is disposed in an accommodating space 53a for accommodating sound source. The endless sound recording belt 58 is passed over rolls 59 and 59' which are pivotally disposed at the upper and lower portions within the space 53a in opposition to each other. The recording belt 58 is made to travel at a constant speed by means of a driving wheel 60 which is inserted through an opening 56a. While, a magnetic head or pickup 61 inserted through an opening 55a abuts the sound recorded face of the recording belt 58. Although not illustrated, the two rolls may be disposed on both sides of the sound source space so that the endless sound recording belt passed over them may be moved in the horizontal direction. The magazine shown in FIGS. 12–16 is adapted to be mounted in a player and projector, and light from a suitable source is applied to the picture source 57a to project a picture carried thereon. At the same time, the sound recording belt 58 is made to move at a constant speed by means of the driving roll 60 to thereby reproduce the sound record carried on the recording belt 58 by means of the magnetic head or pickup 61 which is brought into abutment with the belt 58.

FIGS. 17–24 illustrate another embodiment of the invention. A slide frame 71 is made of such material as plastic, paper or metal, and a film 72 of a picture source is mounted internally thereof as shown in FIG. 18. On one edge of said slide frame 71, there are provided graduations 73 for controlling the running time for the film, that is, the time required for sound reproduction for the content of the slide. In the graduations 73 of the slide frame 71, there is provided a controlling cutout portion 74 in the form of a cutout, perforation, slot, or the like, as shown in FIGS. 17, 19, 21 and 22. The slide frame 71 is accommodated in a magazine 75 of thin thickness just as in the previous embodiments.

In FIG. 17, it will be seen that the controlling cutout portion 74 is provided at a position corresponding to the length of controlled time. Supposing that a playing duration of the slide is 23 seconds. In this case, the cutout may be provided approximately at the point indicating 25 seconds, because each space between two graduations of the controlling graduations 73 in FIG. 17 indicates 5 seconds. In this manner, it will be able to take out a control signal in about 2 seconds after the sound reproduction for the slide has been finished. The controlling cutouts 74 and 74' shown in FIGS. 19, 21 and 22 may likewise be disposed at such a position that a control signal may be obtained after the termination of sound reproduction, and a time within 5 seconds will suffice in practical use.

Figure 21:
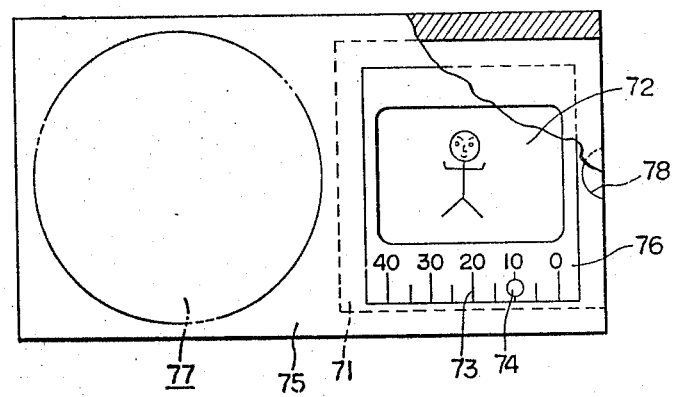

According to FIGS. 19 and 21, the slide element of picture source having the controlling cutout 74 and sound source section 77 are disposed flatwise within the unitary magazine 75. The magazine 75 is fabricated from such material as transparent or opaque plastic, paper, or metal, and has an opening 76 to permit passage of light through the picture source element 72. A recess 78 is formed at one end edge of the pocket to facilitate the access to the picture source element 72, as best shown in FIG. 21.

Figure 22:
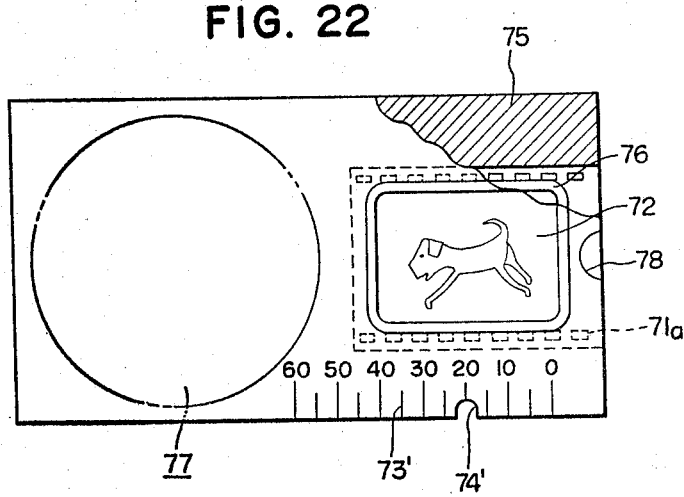

FIG. 22 illustrates the magazine 75 in which a film 71a is used in place of the slide element 72 forming a picture source. In this type of magazine, controlling graduations 73' are provided at an edge portion of the thin magazine 75, and the controlling cutout 74' is also disposed at this portion.

Figure 23:
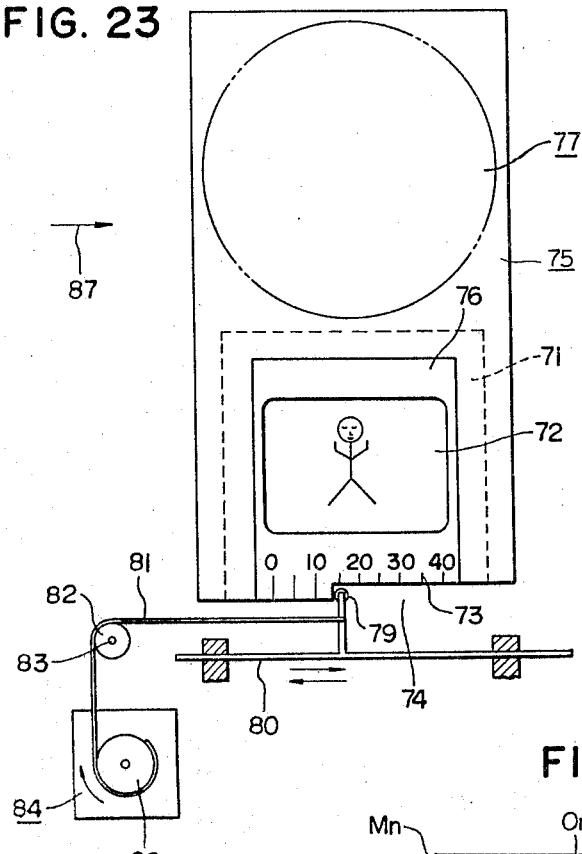

The magazine of this embodiment cooperates with a timer in a manner as illustrated in FIG. 23. When, the magazine 75 is inserted in the direction as shown by arrow 87, the right-hand side face of the controlling cutout 74 abuts a detector element 79 which can move to and fro in cooperation with a timer 84. Further insertion of the magazine 75 inwardly causes the detector element 79 to move rightwards, hence a detecting arm 80 moving to and fro in unitary relation with the detector element 79 is made to move rightwards, and thus a wire 81 connected thereto is also pulled rightwards. The wire 81 causes a setting wheel 86 of the timer 84 to rotate through a pulley 82 rotatably supported about a pivot 83, and a desired playing time can be set at the timer 84 depending on an angle of rotation of said setting wheel 86. The timer may be set by moving the detector element 79 after the magazine 71 has been inserted in place. By thus setting the controlling time, a control signal can be generated, and it is possible to make automatic exchange of the magazines each containing the pair of one slide element and the sound recording element.

Figure 24:
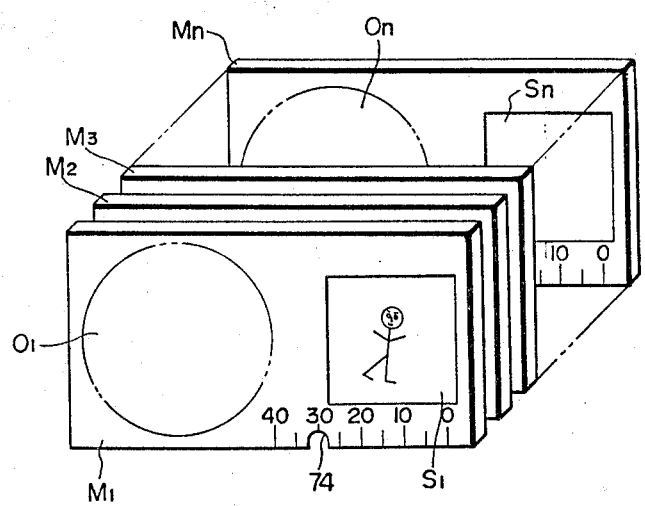
Figure 25:
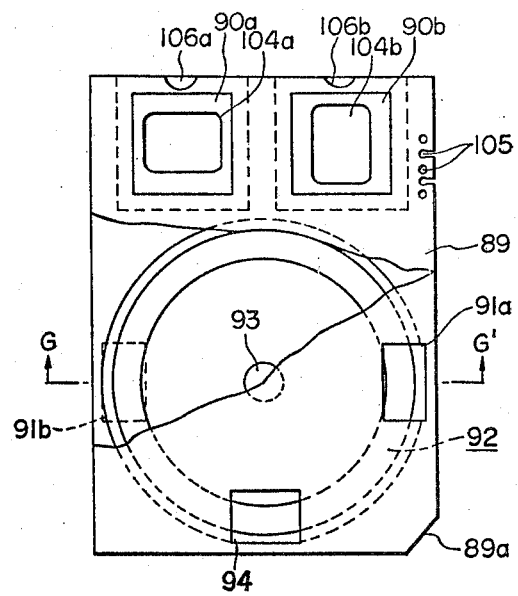
Figure 26:
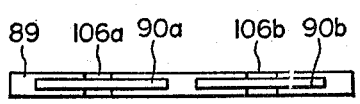

FIG. 24 illustrates a manner of successively reproducing a group of the thin magazines of said embodiment having the picture source in the form of the slide element. A unit magazine $M_1$ including a slide picture source $S_1$ and a sound source $O_1$ is controlled by the controlling cutout 74, and then a subsequent magazine $M_2$ is set and reproduced. In this manner, magazines $M_3 \ldots M_n$ are consecutively mounted for sound reproduction and projection and detached thereafter.

It will be known that, in the magazine according to the embodiment shown in FIGS. 17–24, the controlling cutout common to the picture source element or independent thereof is provided at a portion of the thin magazine casing accommodating flatwise therein the picture source element and the sound source element so as to provide means of recording the controlling time and signal. Therefore, it will be apparent that the unit magazines comprising the sound recording element and the picture source with the picture source made as a basis of control of such unit magazines can be automatically and optionally exchanged, and there is no accumulation of time errors caused by the repeated exchange thereof. A further feature is that said control cut-out can be simply formed, for example, by punching. The signal so recorded which indicates the time required for the reproduction or the projection can be read at a glance and can easily be taken out by an inexpensive timer, thus providing an extremely great advantage for practical use. Moreover, the magazines can very conveniently be used in practical use, since each magazine including the unit picture and sound sources is independent of others. This will permit fabrication of the magazines in an optional order, variation in their arrangement during sound reproduction and projection, and optional compilation by pulling out a portion thereof.

FIGS. 25–30 illustrate still another embodiment of the invention. A magazine 88 comprises a thin casing 89 of such material as transparent or opaque plastic, paper or metal, wherein a sound recording disc 92 and two slide elements 90a and 90b, as picture source are separately accommodated flatwise. Said slide elements 90a and 90b contain therein picture sources 104a and 104b in the form of film, respectively. The slide elements 90a and 90b can be mounted in and detached from the thin casing 89 through a socket provided at a side edge thereof. On said side edge of the thin casing 89, there are formed recesses 106a and 106b to provide easy access to the slide elements 90a and 90b, respectively.

Although not illustrated, the picture sources 104a and 104b in the form of film and without any frame structures therefor may be detachably mounted by a jig and held in place in the thin casing 89 by the friction thereof, or may be bonded to the inside faces of the thin casing 89 by means of an adhesive.

Figure 27:
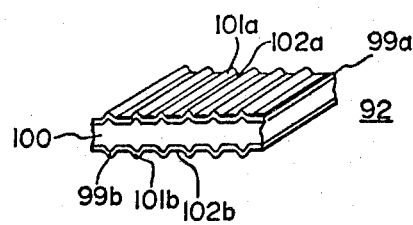
FIG. 27 is an enlarged perspective view of a portion of a sound recording disc mounted in the magazine of FIG. 25.
Figure 28:
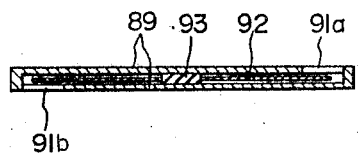
FIG. 28 is a sectional view taken on the line G'—G' of FIG. 25.

As shown in FIG. 27, the sound recording disc 92 may be of a conventional structure wherein magnetic or cutting sound recording may be applied on both the front and back faces thereof. The sound recording disc 92 comprises a disk-shaped base 100 of such material as paper, plastic or metal, or two sheets of such bases concentrically overlapped as shown by chain-dot lines. On both faces of the base 100, there are disposed a front and a back magnetic sound recording layer 99a and 99b, on which head guides 101a and 101b, and sound tracks 102a and 102b are spirally formed with respect to the center of rotation, respectively. An exceedingly large pitch is provided at the peripheral starting end of the spiral so that a waiting time can be minimized. The sound track 102a on one face is used for reproducing the sound corresponding to the slide element 90a, while the sound track 102b on the other face is used for reproducing the sound corresponding to the slide element 90b. Said sound recording disc 92 is rotatably supported by a shaft 93 secured or rotatably disposed within the thin casing 89. The sound recording disc 92 is rotated for recording or reproducing by being held between a driving wheel and an idle wheel (not shown) abutting both its faces through openings 94 bored through a portion of the thin casing 89.

Figure 29:
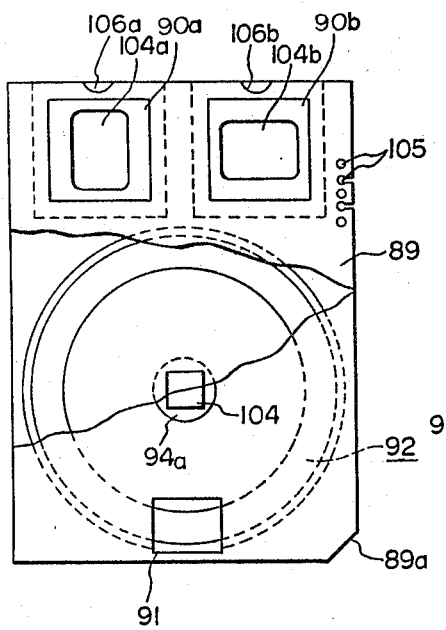
FIG. 29 is a plan view of another form of the magazine of the invention having two picture sources therein.

In FIG. 29, a square hole 13 is bored through the sound recording disc 92, and a square shaft is fitted in the square hole 103 through openings 94a bored through the upper and lower faces of the thin casing 89 for providing rotary movement of the sound recording disc 92.

Figure 30:
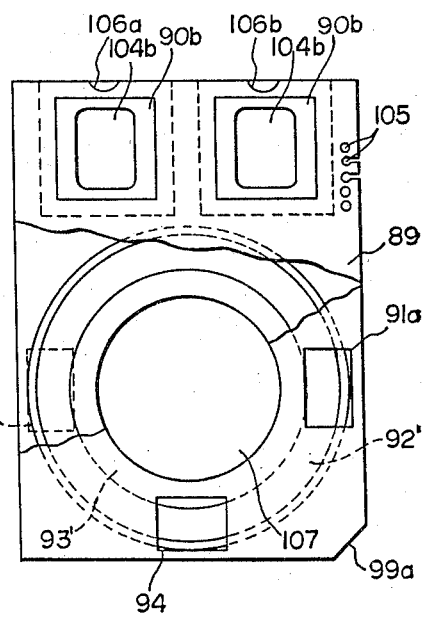
FIG. 30 is a plan view of still another form of the magazine of the invention having two picture sources therein.

In FIG. 30, an annular sound recording member 92' is used in lieu of said sound recording disc. Said annular sound recording member 92' is pivotally supported by a cylindrical supporting member 93' having a central opening 107. Said central opening 107 can be effectively utilized for passing a portion of a magazine playing mechanism therethrough or providing an optical path, thus enabling to make a magazine player small in size. The central opening 107 can further be utilized to arrange a number of the magazines in aligned relation when they are taken off the player.

Projections may suitably be disposed on the faces of the thin casing 89 opposite the sound recording disc 92 so as to reduce nonuniform friction therebetween. A group of code holes 105 may be provided at a portion of the periphery of the thin casing 89 so as to facilitate the sorting and compilation of picture and sound sources to be played. Openings 91a and 91b are provided so that a recording and reproducing head can abut the sound recording disc 92.

The magazine shown in FIGS. 25-30 can be played in the following manner. At first, light is made to strike the slide picture source 90a of the thin casing 89 to project the picture carried thereon, and a reproducing head is applied to the sound track 102a of the sound recording disc 92 accommodated in the same thin casing 89 to reproduce the explanation, music or the like corresponding to said picture. After this operation, light is applied to the other slide picture source 90b of the thin casing 89 to project the picture in like manner, and a reproducing head is applied to the other sound track 102b of said sound recording disc 92 to reproduce the sound likewise. In actual operation, a suitable number of such thin casings 89 are stacked up in tiers or arranged in a suitable order and successively mounted in a projector at intervals of a suitable time for effecting continuous projection and sound reproduction.

It will be known that the magazine of the embodiment shown in FIGS. 25-30 comprises the slide picture source section and the sound recording disc for sound source accommodated in the thin casing separately from each other. Said picture source section comprises two slide elements disposed in juxtaposition with each other, and the sound recording disc forming the sound source section has the sound tracks on the front and back faces thereof corresponding to the two slide elements, respectively. Therefore, it will be apparent that the magazine of this embodiment has twice as much content as the magazine having only one slide element and one sound recording disc, in spite of a small size of the former. Further advantages of the embodiment are that number of sheets in one series of the magazines can be reduced consistent with about one half of the volume occupied, which provides ease of transportation and storage in addition to a low manufacturing cost.

With the magazine of the embodiment having two picture sources, it will be seen that optional compilation can freely be made and the most effective utilization of the magazines can be attained by varying the arrangement thereof, or picking out a portion thereof, or by adding some of them, depending on the degree of knowledge of an audience or depending on the purpose of the educational training. The magazines are entirely free from bringing forth any discrepancy between the sound and picture sources during storage, and any specific picture and sound sources can be readily selected.

Hereinbefore, description has been made with reference to various examples of the picture and sound sources accommodated in the magazine according to the invention. Explanation will be made hereinunder on a more materialized basis with reference to structure of magazines for accommodating these picture and sound sources.

Figure 31:
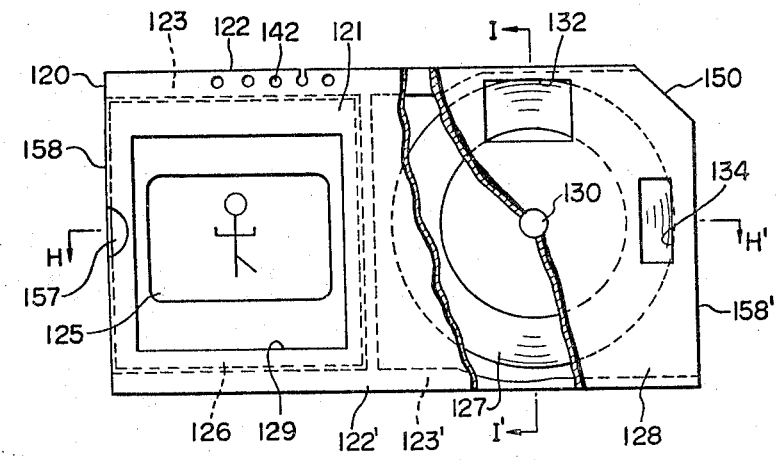
FIG. 31 is a plan view of an embodiment of a magazine of the invention having a sound recording disc.
Figure 32:
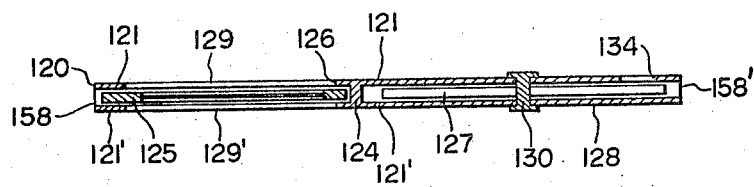
FIG. 32 is a sectional view taken on the line H'—H' of FIG. 31.

One preferred form of the magazine of the invention is shown in FIGS. 31 and 32. The magazine 120 comprises thin sheets 121 and 121' of such material as transparent or opaque plastic, paper or metal disposed opposite to each other and spaced apart a minute gap therebetween. Two opposite sides 122 and 122' thereof are bonded together or tightly closed by longitudinal members 123 and 123'. A transverse member 124 is disposed centrally of the magazine to divide it into a compartment 126 for a slide element 125 forming a picture source and a compartment 128 for a grooved or magnetic sound recording disc 127 forming a sound source which are disposed separately from each other. A pocket 158 for receiving therein said slide element 125 is formed on one end of said magazine, and a pocket 158' is likewise formed on the other end to receive therethrough said sound recording disc 127.

On both faces of the compartment 126 for the slide element 125 in said magazine 120, there are formed two opposed transparent portions or windows 129 and 129' for receiving light therethrough. A recess 157 is formed at the edge of the socket 158 to provide easy access to the slide element 125.

Figure 33:
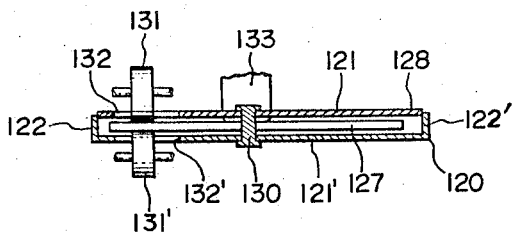
FIG. 33 is a sectional view taken on the line I—I' of FIG. 31.

A supporting shaft 130 for the sound recording disc 127 is provided in the compartment 128 for the sound recording disc 127. As shown in FIG. 33, openings 132 and 132' are formed in the compartment 128 in opposition to each other so as to receive therethrough rollers 131 and 131', respectively, which abut the sound recording disc 127 to drive it for rotation. Further, an opening 134 is formed in the compartment 128 so as to receive therethrough a reproducing head 133 such as a magnetic head or pickup which abuts the sound recording disc 127. Said opening 134 may be formed in a manner that it extends radially from the center of the recording disc 127.

Figure 34:
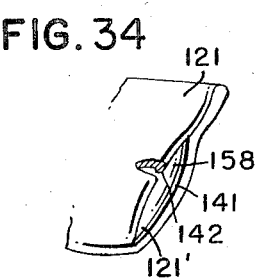
FIG. 34 is a perspective view of one form of a socket of the magazine of the invention.
Figure 38:
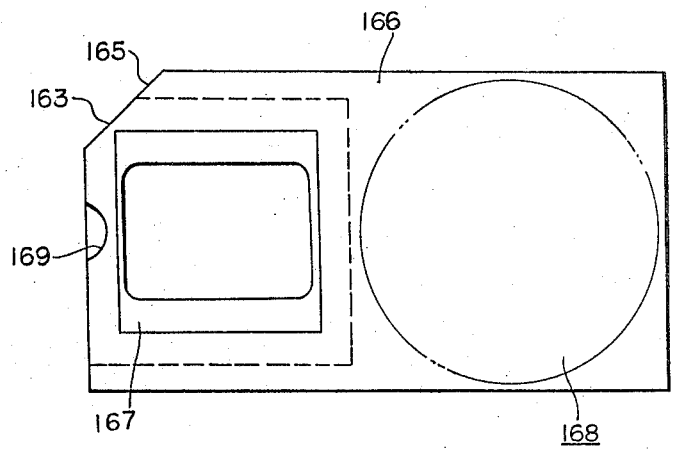
FIG. 38 is a plan view of an embodiment of a magazine of the invention wherein means are provided for correct positioning of a slide element.
Figure 39:
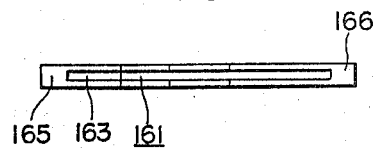
FIG. 39 is a side elevational view of the magazine of FIG. 38.
Figure 40:
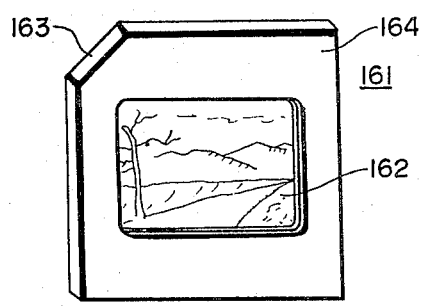
FIG. 40 is a perspective view of the slide element mounted in the magazine of FIG. 38.

The slide element 125 may directly be formed of a one-scene film instead of a conventional structure wherein a film is mounted in a frame such as of paper. The sound recording disc 127 may be any of such recording members as a grooved sound recording disc, magnetic sound recording disc having spirally disposed guide grooves 135 as shown in FIG. 34, and a sound sheet recently developed.

Instead of frictional rotation by means of the rollers 131 and 131' as shown in FIG. 33, a square hole 136 may be formed at the center of the sound recording disc 127 as shown in FIG. 36, and a rotating shaft to fit in the square hole 136 may be used to rotate the sound recording disc 127.

The magazine 120 may be comprised of two members detachably coupled together, that is, a compartment structure 137 for the slide element 125 and a compartment structure 138 for the sound recording disc 127, as shown in FIG. 37. For example, a groove 139 and a feather 140 may be formed in end edges of the compartment structures 137 and 138, respectively, as shown in FIG. 37, to detachably couple the structures 137 and 138 together to form a unitary magazine. The pocket 158 and 158′ for the respective slide element 125 and the sound recording disc 127 may be bonded together to provide a hermetic seal thereat, or a groove 141 and a ridge 142 may be formed thereat to provide a slide fastener structure whereby the pocket can be sealed and opened as required.

Preferably, code holes 142a may be provided at a portion of the magazine 120 to facilitate the sorting, compilation, etc. thereof, and a cutout 150 may be provided at one corner of the magazine 120 to provide a means for properly positioning the sound recording disc 127. In case the magazine is composed of the compartment structure 138 for the sound recording disc and the compartment structure 137 for the slide element, the cutout 150 at one corner of the magazine and the code holes 142a in each of the compartment structures may preferably be provided.

In practical use, the magazine 120 is mounted in a projector, as shown in FIG. 35, with the slide element 125 and the sound recording disc 127 properly accommodated in the compartment structures 126 and 128, respectively. Light from a light source 143 is applied to the slide element 125 through a condenser lens 144, and the picture on the slide element 125 is projected on a screen 146 through a lens 145. In this case, suitable mirrors 147 and 148 may preferably be interposed in the system so that the slide element 125 may not be harmed by the heat emitted from the light source 143.

When the picture on the slide element 125 is projected on the screen 146, the sound recording disc 127 encased in the same magazine 120 with the slide element 125 is made to rotate by the rotating mechanism through the rollers 131 and 131′ or by the rotating shaft, and the reproducing head 133 reproduces the explanation, sound or the like corresponding to the picture on the slide element 125, said sound being reproduced through a suitable amplifying and reproducing system.

As in the previous embodiments, a suitable number of the magazines 120 may be stacked up in tiers or arranged in a suitable order and successively mounted in the projector at intervals of a certain time, for example, 5, 10 or 20 seconds depending on the time required for explanation or the like for effecting continuous projection and sound reproduction.

With the sound recording disc 127 having an outside diameter of 70 mm., a spiral pitch of sound grooves of 0.4 mm., and number of revolutions of the order of 16 to 33 r.p.m., it will be able to make recording for about 30 to 60 seconds, which recording time will be quite sufficient for the explanation of one scene of an ordinary slide.

Since said magazine comprises the sound source and the picture source accommodated separately from each other in the thin casing which is of a unitary structure or can be combined into the unitary structure, it will be apparent that optional compilation of such magazines may be freely made by varying the arrangement of the magazines or picking out a portion thereof or adding some magazines thereto, and there is utterly no need of preparing extra sound and picture sources.

According to the embodiment, each magazine 120 contains one unit of the sound and picture sources and two openings 132 and 134 are provided at least one face of the thin sheet 121 of the sound source section for receiving through said opening 132 the driving wheel 131 to rotate the sound recording disc 127 and for receiving through said opening 134 the reproducing head to bring it in abutting relation with the sound recording disc 127. Therefore, it will be apparent that, with the thin magazine wherein the slide element and the sound recording disc are disposed flush with each other, such magazine can be rotated in a simple manner and a mechanism for mounting it in and detaching it from a player can be constituted in an extremely simple manner, thus providing ease of handling.

The magazine, for example, may be 130 mm. long, 80 mm. broad and 3 mm. thick in dimensions. Or more precisely, the magazine may comprise a core structure 130 mm. long, 80 mm. broad and 2 mm. thick covered on both faces by thin sheets of 0.5 mm. in thickness, and the sound element of 70 mm. in diameter and the slide element may be disposed therein.

The slide element may be used either longitudinally or laterally as required. This is because the slide frame has the same length longitudinally as well as laterally, and the picture source (film) can freely be inserted thereinto both longitudinally and laterally. However, in case the slide element 125 is secured in the magazine 120 by means of an adhesive, or in case the magazine is so constructed that the slide element 125 is held therein by the resiliency acting inwardly of the two thin sheets 121 and 121′, two kinds of such magazines 120 may be prepared to permit insertion of the slide element 125 with its longitudinal or lateral side.

Since, further, the surface of the magazine 120 has a substantial area, an outline of the information carried by the magazine may be written thereon. Still further, by providing a specific guide portion having a large pitch at the starting portion of the spiral guide of the sound recording disc 127, there is almost no waiting time and it is possible to minimize a vacant soundless time wherein only the picture is projected.

Next, description will be made with reference to various embodiments related to determination of the accurate positions of picture and sound sources when mounted in a player for playing.

FIGS. 38–41 relate to the positioning of a picture source element 161. Said picture source element 161 comprises a square-shaped frame 164 of such material as transparent or opaque plastic, paper or metal, and a film 162 mounted in said frame 164. At one corner of a rear end edge of the frame 164, there is formed a slanted cutout 163 which is made to have a certain relation with the longitudinal and lateral sides as well as the front and back faces of the picture in the film 162. While, at one corner of the edge of the pocket of the thin casing 166, there is formed a slanted cut-out 165 which corresponds to the slanted coutout 163 of said picture source element 161.

Figure 41:
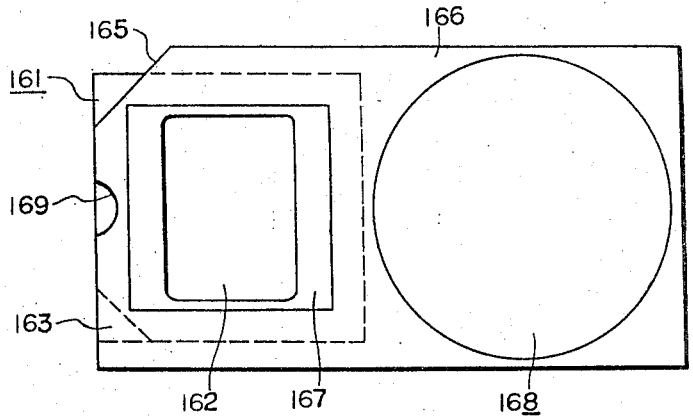
FIG. 41 is a plan view showing a state when the slide element of FIG. 40 is erroneously inserted in the magazine of FIG. 38.

According to said method, the cutout 163 of the picture source element 161 aligns the cutout 165 of the thin casing 166 only when the picture source element 161 is correctly inserted into the thin casing 166. It will be seen that the normal insertion can thus be ascertained. In an erroneous relation, that is, in case the picture element 161 is inserted with its longitudinal and lateral sides inverted or its front face and rear face inverted, a portion of the picture source element 161 protrudes from the thin casing 166 as shown in FIG. 41, clearly indicating that the insertion is made erroneously, and providing a means of easy handling.

A second embodiment for effecting the correct positioning of a picture source element is illustrated in FIGS. 42–47. In this embodiment, a projection 175 is provided at an inside wall of a thin casing 176 with which a leading edge of a picture source element 171 abuts, so that a recess 173 of the picture source element 171 snugly fits the projection 175 of the casing 176.

Figure 42:
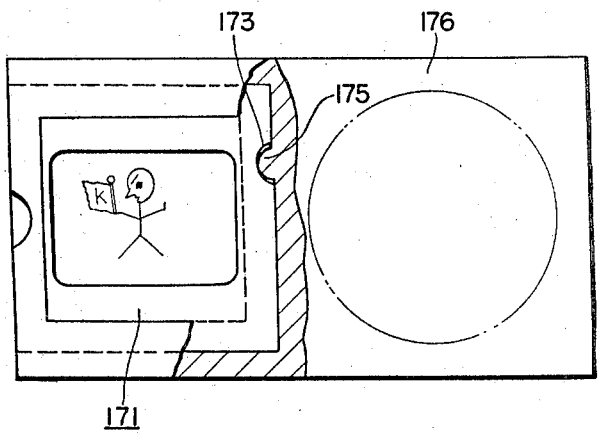
FIG. 42 is a plan view of a modification of the magazine of FIG. 38.
Figure 43:
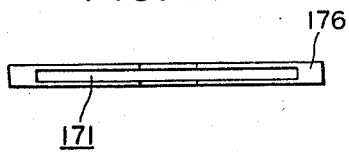
FIG. 43 is a side elevational view of the magazine of FIG. 42.
Figure 44:
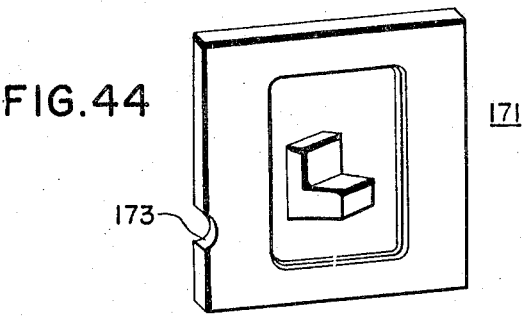
FIG. 44 is a perspective view of a slide element accommodated in the magazine of FIG. 42.
Figure 45:
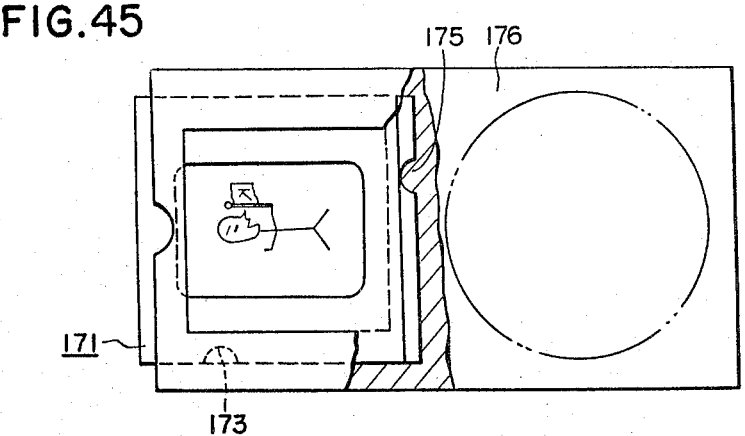
FIG. 45 is a plan view showing a state when the slide element of FIG. 44 is erroneously inserted into the magazine of FIG. 42.
Figure 46:
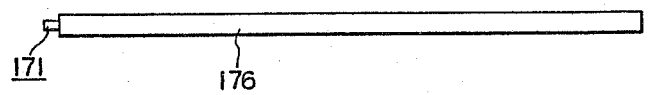
FIG. 46 is a front elevational view of the magazine of FIG. 45.

According to this method, the recess 173 of the picture source element 171 snugly fits the projection 175 of the thin casing 176 as shown in FIG. 42, only when the picture source element 171 is correctly inserted into the thin casing 176. The picture source element 171 can thus be correctly positioned in the casing 176. In a wrong relation, for example, in case the picture source element 171 is inserted with its longitudinal side laterally or its upper face back, full insertion of the picture source element 171 can not be made by being obstructed by the projection 175, as shown in FIG. 42. Thus, erroneous insertion can easily be identified and the handling of the picture source element 171 can be facilitated.

Figure 47:
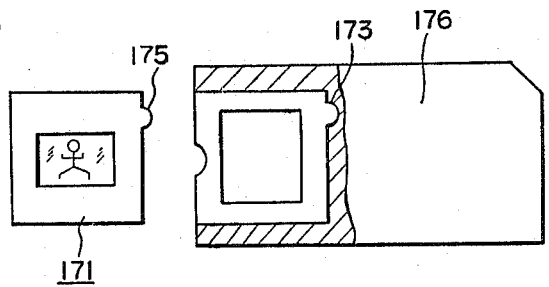
FIG. 47 is a plan view of a modification of the magazine of FIG. 42.
Figure 48:
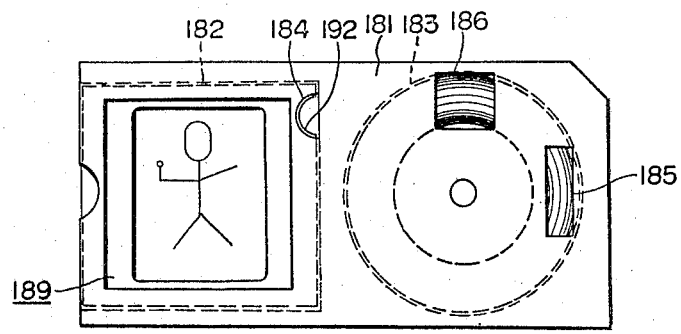
FIG. 48 is a plan view of another modification of the magazine of FIG. 42.
Figure 49:
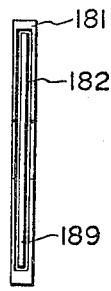
FIG. 49 is a side elevational view of the magazine of FIG. 48.
Figure 50:
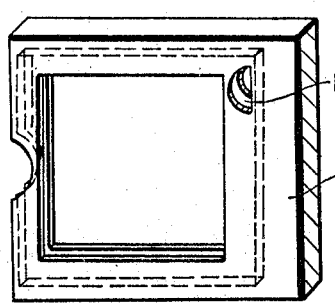
FIG. 50 is a perspective view of a picture source section of the magazine of FIG. 48.
Figure 51:
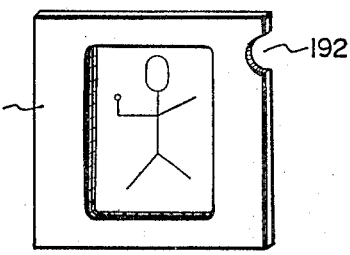
FIG. 51 is a perspective view of a slide element mounted in the magazine of FIG. 48.

As shown in FIG. 47, there will be no difference in the functional effect when such recess 173 is provided on the thin casing 176 so as to fit the projection 175 provided on the picture source element 171.

FIGS. 48-52 illustrate a third embodiment for attaining the correct positioning of such picture source element. According to this embodiment, a positioning hole 184 is provided at a portion of a picture source receiving space 182 to penetrate both of upper and lower faces of a magazine casing 181. On the upper and lower faces of a sound source receiving space 183 of the magazine casing 181, there are bored openings 185 for receiving therethrough sound source driving rolls. Further, a positioning hole 192 is bored at an upper portion on the right-hand side of a picture source element 189.

Figure 52:
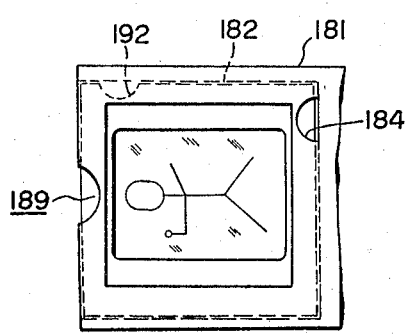
FIG. 52 is an explanatory view showing a state when the slide element of FIG. 51 is erroneously inserted in the magazine of FIG. 48.
Figure 53:
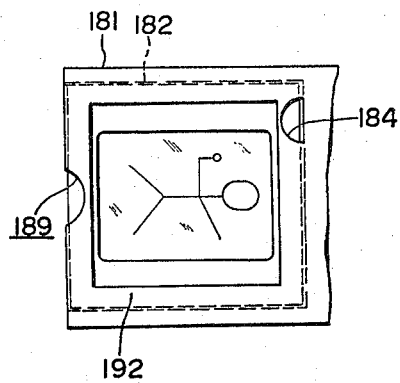
FIG. 53 is a view similar to FIG. 52, but showing another state of erroneous insertion of the slide element into the magazine.

For insertion of the picture source into the picture source receiving space 182 according to the method, the positioning hole 192 of the picture source 189 may be made to align with the positioning hole 184 of the magazine casing 181. When the positioning hole 184 of the casing 181 fails to align with the positioning hole 192 of the picture source 189, this indicates that the picture source 189 is not inserted in its normal position as shown in FIGS. 52 and 53. After alignment of the positioning holes 184 and 192 of the magazine, a positioning pin of a magazine player may be passed through the aligned holes.

Figure 54:
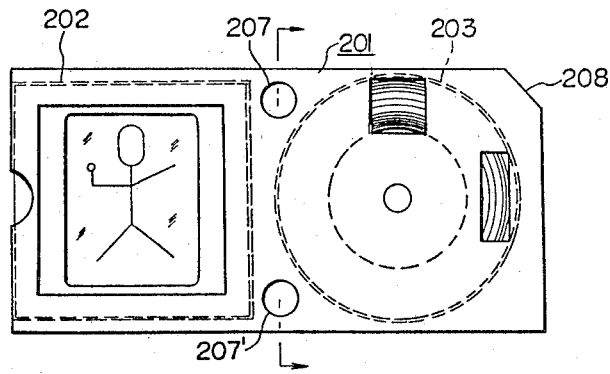
FIG. 54 is a plan view of an embodiment of a thin casing according to the invention wherein means are provided to attain correct positioning thereof.
Figure 55:
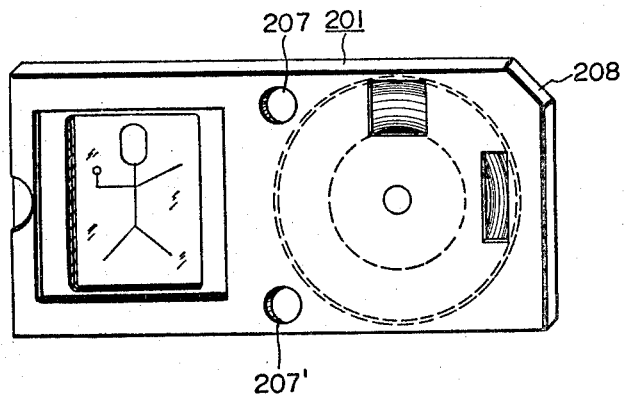
FIG. 55 is a perspective view of the magazine of FIG. 54.
Figure 56:
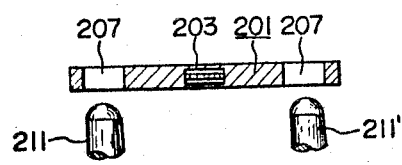
FIG. 56 is a sectional view taken on the line K—K' of FIG. 54.

FIGS. 54-56 relate to a manner of positioning a magazine casing. In the magazine casing 201, there are provided a plurality of positioning holes or recesses 207 disposed between a picture source receiving space 202 and a sound source receiving space 203 of the casing 201.

For mounting such magazine in a player according to this method, positioning pins 211 and 211' of the player are fitted in the positioning holes 207 and 207' of the magazine 201, respectively, and a positioning cutout 208 of the thin casing 201 is utilized to determine the normal mounting position of the casing 201.

Figure 57:
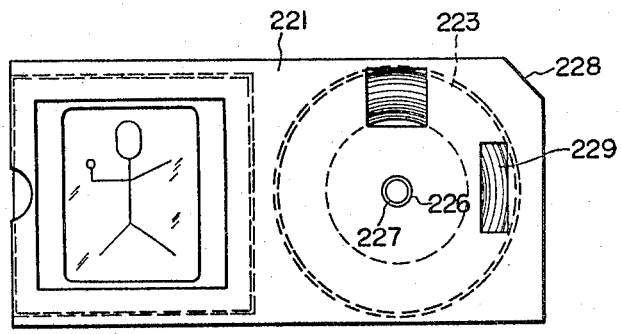
FIG. 57 is a plan view of another embodiment of the invention wherein means are provided for correct positioning of a thin casing.
Figure 58:
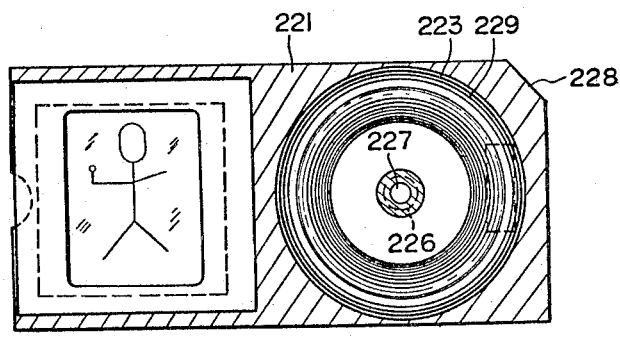
FIG. 58 is a cross-sectional view of the thin casing of FIG. 57.
Figure 59:
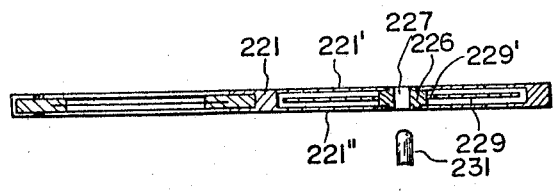
FIG. 59 is a longitudinal sectional view of the thin casing of FIG. 57.

FIGS. 57-59 illustrate a second method of positioning such magazine casing. A shaft 226 provided at the center of a sound source receiving space 223 is secured at both ends to an upper sheet 221' and a lower sheet 221'' of the thin casing 221, and a positioning hole 227 is bored in the shaft 226. The positioning hole 227 may not necessarily penetrate through the shaft, but may take the form of a recess. A positioning cutout 228 is provided at one corner of the casing 221, and a disc-shaped sound source 229 such as a magnetic sound recording disc or cutting recording disc is inserted in the sound source receiving space 223 of the casing 221 with its central hole 229' loosely fitted on said shaft 226.

For mounting the magazine in a player according to this method, the positioning hole 227 of the shaft 226 of the magazine is fitted on a positioning pin 231 provided on the player, and the cutout 228 is utilized to determine the normal mounting position of the magazine.

According to this method, the positioning of the magazine can easily be attained and any out-of-alignment of the disc-shaped sound source 229 from the center of rotation can be minimized by fitting the positioning pin 231 of the magazine player in the positioning hole 227 of the shaft 226. This shaft 226 is also effective to reinforce the magazine casing 221.

Figure 60:
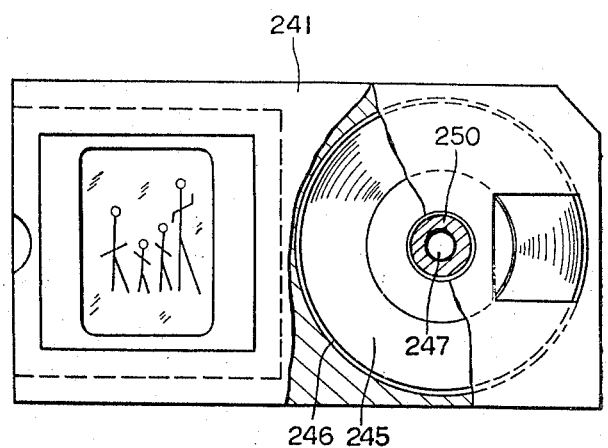
FIG. 60 is a plan view of a further embodiment of the magazine of the invention having a sound recording disc therein.
Figure 61:
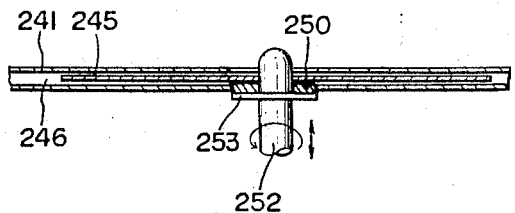
FIG. 61 is an explanatory view showing a mechanism of driving the sound recording disc of FIG. 60.

FIGS. 60 and 61 illustrate a manner of driving a sound recording disc. A magnetic sound recording disc 245 received in a circular recess 246 provided in a thin casing 241 has a driving shaft receiving hole 247 formed at the center thereof. The disc 245 is mounted in the casing 241 in a manner that the hole 247 is concentric with openings 248 formed on both faces of the casing 241. A magnetic metal 250 is fitted about the driving shaft receiving hole 247. A driving shaft 252 which fits in the receiving hole 247 has an annular magnet 253 fitted adjacent the top end thereof. Thus the driving shaft 252 urges the disc 245 to rotate with this magnet 253 attracted to the magnetic metal 250. The driving shaft 252 is freely movable toward and away from the disc 245 for engagement therewith and disengagement therefrom. No demagnetization by the magnet 253 will be caused since the sound recording portion of the disc 245 is at a considerable distance therefrom.

As described in the foregoing, the magazine of this embodiment is so constituted that the picture source such as a slide element and the sound source are disposed in the magazine separately from each other and the magnetic metal is fitted about the central circular hole of the sound source disc. It will be apparent that this arrangement is superior to such systems wherein driving rollers are forced onto a sound recording disc from both sides thereof for rotation, or a square hole is formed at the center of a disc for receiving therein a square-shaped columnar driving shaft for rotating the disc, because, according to the present method, the disc can be positively rotated by merely making the magnet provided on the driving shaft to be attracted to the magnetic metal provided on the disc. Therefore, the driving means therefor can be extremely simplified, and the circular shape of the driving shaft and the central hole of the disc permits easy insertion of the shaft into the hole regardless of whatever positions the disc or shaft may take when it stops. Another advantage apparently resides in its low manufacturing cost.

Although the invention has been described with reference to the specific embodiments, it will be understood that the invention is in no way limited to such embodiments and various modifications and changes may be made without departing from the spirit of the invention.

What is claimed is:

1. A picture and sound-slide magazine adapted for sound-record reproduction corresponding to a projected picture, comprising at least one picture element to be projected, a sound-recording means having at least one sound track carrying sound to be reproduced, means for mounting said picture element and said sound-recording means juxtapositioned flatwise and separately in casings, said casings being of a thin thickness, said casing carrying said sound-recording means having therein an opening providing access for engaging a reproducing head with said recording means and means for detachably coupling said casings in frictional engagement.

2. A picture and sound-slide magazine according to claim 1 wherein a further access opening is provided in said casing carrying said sound-recording means, said further access opening being in the opposite side of said casing from said access opening and providing access for means to drive said sound-recording means.

3. A picture and sound-slide magazine according to claim 1 wherein one corner of said picture element and a corresponding corner of the casing carrying said picture element are removed so as to allow proper alignment of said picture element during insertion thereof into said casing and of said casing during insertion thereof into a projector.

4. A picture and sound-slide magazine according to claim 1 comprising an inwardly directed projection on said casing carrying said picture element, a cutout on said picture element, said cutout engaging with said projection to insure proper alignment of said picture element in said casing.

References Cited by the Examiner

UNITED STATES PATENTS

| | | | |
|---|---|---|---|
| 230,824 | 1/1866 | Schwartz et al. | 88—28 X |
| 1,633,376 | 6/1927 | Freeman | 88—26 X |
| 3,063,338 | 11/1962 | Bregman | 88—28 |
| 3,141,374 | 7/1964 | Berry | 88—28 |
| 3,176,580 | 4/1965 | Metz | 88—28 |
| 3,177,768 | 4/1965 | Hallamore | 88—28 |
| 3,191,494 | 6/1965 | Schwartz et al. | 88—28 |

FOREIGN PATENTS

| | | |
|---|---|---|
| 624,401 | 5/1963 | Belgium. |
| 503,937 | 4/1939 | Great Britain. |

OTHER REFERENCES

Reinert, German application 1,045,122, published Nov. 27, 1958.

JOHN M. HORAN, *Primary Examiner.*

NORTON ANSHER, *Examiner.*

H. H. FLANDERS, W. MISIEK, R. A. WINTERCORN,
*Assistant Examiners.*